United States Patent
Ghosh et al.

(10) Patent No.: US 9,875,506 B2
(45) Date of Patent: Jan. 23, 2018

(54) METHOD AND SYSTEM FOR PROVIDING FINANCIAL PERFORMANCE DATA ASSOCIATED WITH A MERCHANT

(71) Applicant: MasterCard International Incorporated, Purchase, NY (US)

(72) Inventors: Debashis Ghosh, Charlotte, NC (US); Randy Shuken, Westport, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/268,790

(22) Filed: May 2, 2014

(65) Prior Publication Data

US 2015/0317747 A1    Nov. 5, 2015

(51) Int. Cl.
G07B 17/00    (2006.01)
G07F 19/00    (2006.01)
G06Q 40/02    (2012.01)
G06Q 40/00    (2012.01)

(52) U.S. Cl.
CPC ............ G06Q 40/02 (2013.01); G06Q 40/12 (2013.12)

(58) Field of Classification Search
None
See application file for complete search history.

(56) References Cited

U.S. PATENT DOCUMENTS

| | | | |
|---|---|---|---|
| 5,724,261 A | 3/1998 | Denny et al. | |
| 7,024,397 B1 | 4/2006 | Donahue | |
| 7,130,810 B2 | 10/2006 | Foster et al. | |
| 7,440,921 B1 | 10/2008 | Rieger et al. | |
| 7,739,163 B1 | 6/2010 | Geller et al. | |
| 8,260,645 B2 | 9/2012 | Banerjee et al. | |
| 8,341,089 B2* | 12/2012 | Fassio et al. | 705/313 |
| 8,417,625 B2* | 4/2013 | Bannerjee et al. | 705/38 |
| 8,452,708 B1* | 5/2013 | Birenbaum et al. | 705/40 |
| 8,539,597 B2 | 9/2013 | Arasaratnam et al. | |
| 2001/0037273 A1 | 11/2001 | Greenlee | |
| 2003/0078878 A1 | 4/2003 | Opsahl-Ong | |
| 2004/0088241 A1* | 5/2004 | Rebane et al. | 705/37 |
| 2005/0015326 A1 | 1/2005 | Terry | |

(Continued)

OTHER PUBLICATIONS

International Search Report and Written Opinion for Application No. PCT/US2015/027992, dated Jul. 23, 2015, pp. 11.

*Primary Examiner* — Fateh M Obaid
(74) *Attorney, Agent, or Firm* — Armstrong Teasdale LLP

(57) ABSTRACT

A method implemented using a computing device in communication with one or more memory devices is provided. The method includes receiving a request from a client computing device to provide financial performance data for at least a first merchant of a plurality of merchants, retrieving transaction data associated with the plurality of merchants from the one or more memory devices wherein the transaction data is associated with payments processed through a payment network, comparing the transaction data associated with the first merchant to the transaction data associated with each of the plurality of merchants to determine at least one ranking of the first merchant relative to the plurality of merchants based on at least one financial performance factor, and transmitting the at least one ranking to the client computing device, in response to the request, without providing a name of the first merchant.

19 Claims, 10 Drawing Sheets

(56) References Cited

U.S. PATENT DOCUMENTS

| | | | |
|---|---|---|---|
| 2006/0143072 A1* | 6/2006 | Herman et al. | 705/10 |
| 2008/0077537 A1* | 3/2008 | Brandhorst | 705/36 R |
| 2008/0270292 A1 | 10/2008 | Ghosh et al. | |
| 2010/0063921 A1 | 3/2010 | Flaherty | |
| 2010/0076813 A1 | 3/2010 | Ghosh et al. | |
| 2010/0094750 A1 | 4/2010 | Ghosh et al. | |
| 2010/0106638 A1 | 4/2010 | Allison et al. | |
| 2010/0274630 A1 | 10/2010 | Newman et al. | |
| 2010/0299238 A1 | 11/2010 | Hecht | |
| 2012/0029956 A1 | 2/2012 | Ghosh et al. | |
| 2012/0030165 A1* | 2/2012 | Guirguis et al. | 707/607 |
| 2012/0158450 A1 | 6/2012 | Ulwick et al. | |
| 2012/0197782 A1 | 8/2012 | Ghosh et al. | |
| 2012/0233087 A1 | 9/2012 | Wanker | |
| 2012/0245976 A1 | 9/2012 | Kumar et al. | |
| 2012/0296724 A1* | 11/2012 | Faro et al. | 705/14.27 |
| 2013/0041841 A1* | 2/2013 | Lyons | 705/36 R |
| 2013/0054650 A1 | 2/2013 | O'Byrne | |
| 2013/0110704 A1 | 5/2013 | Padron et al. | |
| 2013/0144800 A1 | 6/2013 | Fallows | |
| 2013/0191193 A1 | 7/2013 | Calman et al. | |
| 2015/0095212 A1* | 4/2015 | Openlander | 705/38 |

\* cited by examiner

METHOD AND SYSTEM FOR PROVIDING FINANCIAL PERFORMANCE DATA ASSOCIATED WITH A MERCHANT

BACKGROUND

This description relates to processing payment transactions, and more specifically to providing financial performance data associated with a merchant based on processed payment transactions.

In some instances, an owner of a commercial property location, such as a strip mall, may wish to have financial performance data for a merchant. Such data could inform the owner as to whether adding the merchant to the commercial property location would increase the overall financial performance of the commercial property location. Likewise, an investor may wish to have such financial performance data in order to determine the likelihood of an investment in the merchant yielding a favorable return. Parties interested in financial performance data (e.g., the owner of a commercial property or an investor) may be referred to as "interested parties."

However, certain third parties who have access to such financial performance data of a merchant may have limitations regarding what information they may disclose to interested parties. In addition, providing certain metrics (e.g., actual dollar amounts) to interested parties may provide an incomplete picture of the actual financial performance of the merchant.

BRIEF DESCRIPTION OF THE DISCLOSURE

In one aspect, a computer-implemented method for providing financial performance data associated with a merchant is provided. The method is implemented using a computing device in communication with one or more memory devices. The method includes receiving a request from a client computing device to provide financial performance data for at least a first merchant of a plurality of merchants, retrieving transaction data associated with the plurality of merchants from the one or more memory devices wherein the transaction data is associated with payments processed through a payment network, comparing the transaction data associated with the first merchant to the transaction data associated with each of the plurality of merchants to determine at least one ranking of the first merchant relative to the plurality of merchants based on at least one financial performance factor, and transmitting the at least one ranking to the client computing device, in response to the request, without providing a name of the first merchant.

In another aspect, a computing device for providing financial performance data associated with a merchant is provided. The computing device includes one or more processors in communication with one or more memory devices. The computing device is configured to receive a request from a client computing device to provide financial performance data for at least a first merchant of a plurality of merchants, retrieve transaction data associated with the plurality of merchants from the one or more memory devices wherein the transaction data is associated with payments processed through a payment network, compare the transaction data associated with the first merchant to the transaction data associated with each of the plurality of merchants to determine at least one ranking of the first merchant relative to the plurality of merchants based on at least one financial performance factor, and transmit the at least one ranking to the client computing device, in response to the request, without providing a name of the first merchant.

In yet another aspect, a computer-readable storage medium having computer-executable instructions embodied thereon is provided. When executed by a computing device having one or more processors in communication with one or more memory devices, the computer-executable instructions cause the computing device to receive a request from a client computing device to provide financial performance data for at least a first merchant of a plurality of merchants, retrieve transaction data associated with the plurality of merchants from the one or more memory devices wherein the transaction data is associated with payments processed through a payment network, compare the transaction data associated with the first merchant to the transaction data associated with each of the plurality of merchants to determine at least one ranking of the first merchant relative to the plurality of merchants based on at least one financial performance factor, and transmit the at least one ranking to the client computing device, in response to the request, without providing a name of the first merchant.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example payment processing system that includes a performance determination computing device and other computing devices in accordance with one example embodiment of the present disclosure.

FIG. 3 is an expanded block diagram of an example embodiment of a server architecture of the payment processing system including the performance determination computing device and a plurality of other computing devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is a block diagram of an example environment including a commercial property location that includes a plurality of merchants.

FIG. 7 is a block diagram of a geographic area that includes the commercial property location shown in FIG. 6 and a plurality of merchants.

FIG. 8 is a diagram of an example ranking of merchants based on financial performance.

FIG. 9 is a flowchart of an example process that may be performed by the payment processing system for providing financial performance data associated with a merchant.

FIG. 10 is a diagram of components of one or more example computing devices that may be used in embodiments of the described systems and methods.

DETAILED DESCRIPTION OF THE DISCLOSURE

Figure 1:
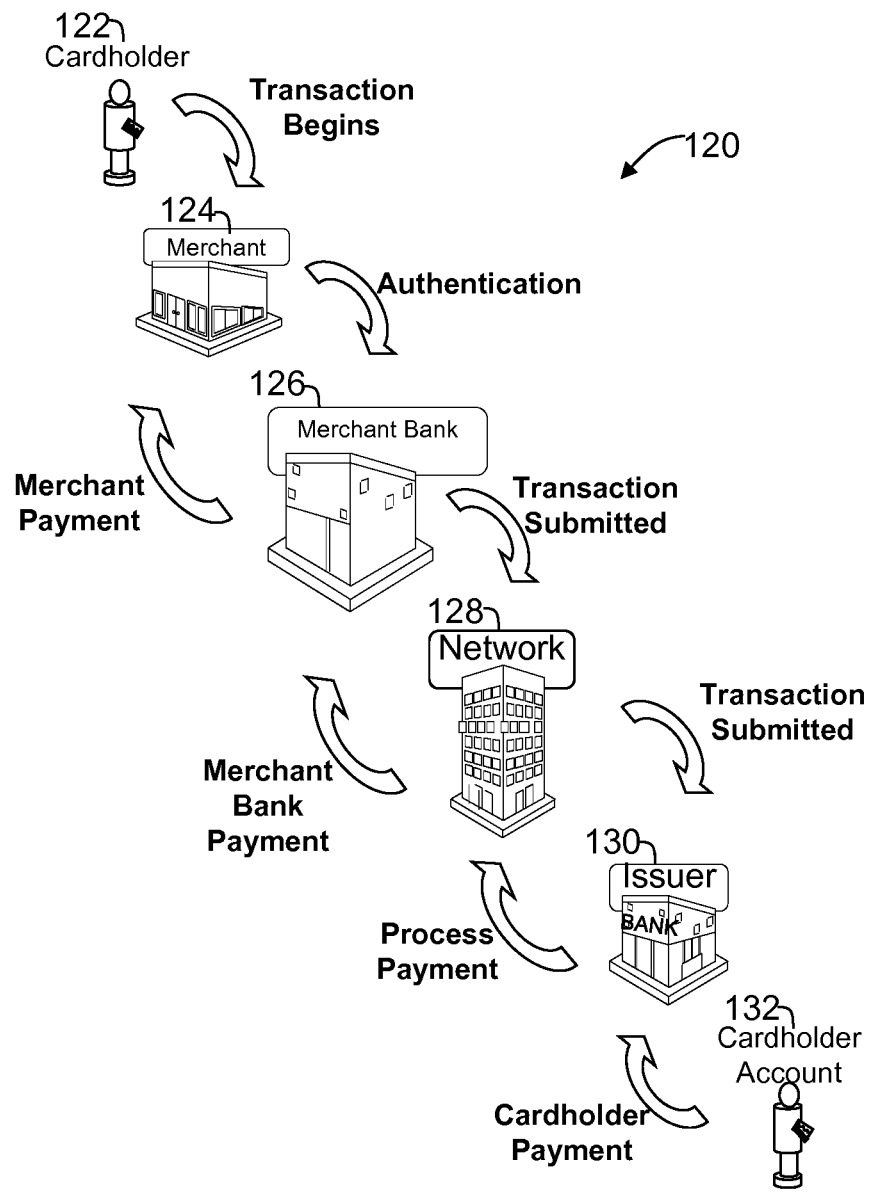
FIGS. 1-10 show example embodiments of the methods and systems described herein.

Implementations of systems described herein store payment card transaction data for a plurality of merchants. More specifically, implementations of the systems described herein access the transaction data and determine four financial performance factors for each merchant: (1) an average cash flow, (2) a standard deviation in the cash flow, (3) a growth rate (i.e., rate of change of the cash flow), and (4) a revenue per unit sold (also referred to herein as "average ticket size"). Implementations of the system additionally rank the merchants based on one or more of the four factors and, in response to a request for financial performance data pertaining to a merchant, provide the financial performance data including at least one ranking of the merchant relative to the other merchants based on at least one of the financial performance factors. Accordingly, implementations of the system provide financial performance data in response to the request, without revealing the underlying dollar amounts associated with the merchant.

Additionally, at least some implementations of the system withhold a name of the merchant when transmitting financial performance data in response to the request. Further, some implementations of the system limit the plurality of merchants to a subset of merchants within a predetermined geographic area (e.g., a zip code). Additionally, some implementations of the system determine overall financial performance data for all of the merchants located within a commercial property location (e.g., a strip mall) and determine whether adding a particular merchant to the commercial property location would increase, decrease, or not affect the overall financial performance for the commercial property location. Some implementations of the system additionally weight a ranking of a merchant based on a size (e.g., cash flow) of the merchant. These and other features of systems and methods that may be implemented by the systems are described in more detail below.

The methods and systems described herein may be implemented using computer programming or engineering techniques including computer software, firmware, hardware or any combination or subset thereof, wherein the technical effect may include at least one of: (a) receiving a request from a client computing device to provide financial performance data for at least a first merchant of a plurality of merchants; (b) retrieving transaction data associated with the plurality of merchants from the one or more memory devices; (c) comparing the transaction data associated with the first merchant to the transaction data associated with each of the plurality of merchants to determine at least one ranking of the first merchant relative to the plurality of merchants based on at least one financial performance factor; and (d) transmitting the at least one ranking to the client computing device, in response to the request, without providing a name of the first merchant.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling ordinary payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment card for an account, such as a credit card account or a debit card account, to a cardholder 122, who uses the payment card to tender payment for a purchase from a merchant 124. To accept payment with the payment card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment card (also known as a financial transaction card), merchant 124 requests authorization from acquirer 126 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 126. Alternatively, acquirer 126 may authorize a third party to perform transaction processing on its behalf. In this case, the pointof-interaction terminal will be configured to communicate with the third party. Such a third party is usually called a "merchant processor" or an "acquiring processor."

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is settled between merchant 124, acquirer 126, and issuer 130. Settlement refers to the transfer of financial data or funds between the merchant's account, acquirer 126, and issuer 130 related to the transaction. Usually, transactions are captured and accumulated into a "batch," which is settled as a group.

Figure 2:
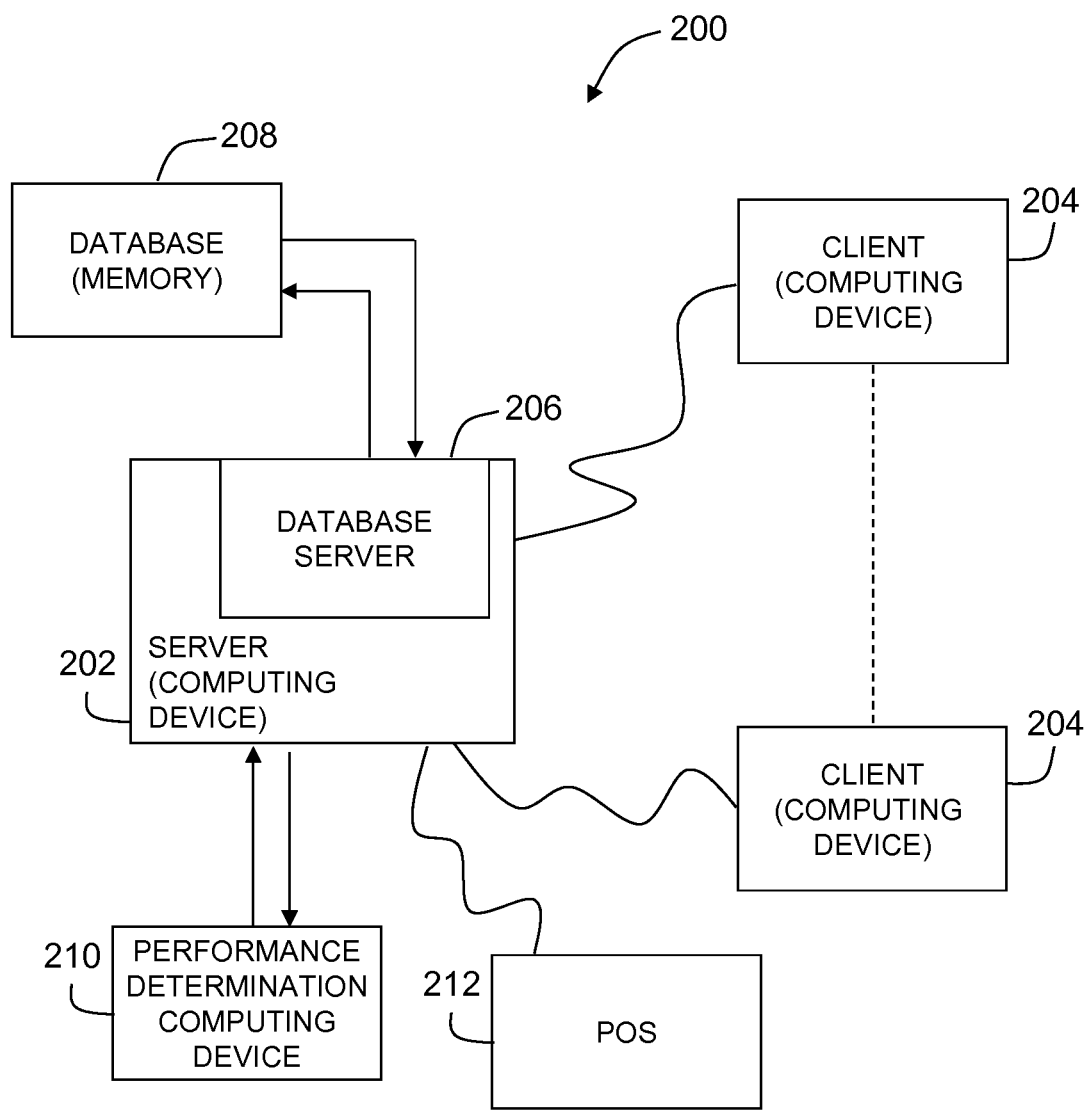

FIG. 2 is a simplified block diagram of a payment processing system 200 that includes a performance determination computing device 210 and other computing devices in accordance with one embodiment of the present disclosure. In the example embodiment, system 200 includes a server system 202 and a plurality of client subsystems, also referred to as client systems 204 or client computing devices, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on server system 202 and may be accessed by potential users at one of client systems 204 by logging onto server system 202 through one of client systems 204. In any alternative embodiment, database 208 is stored remotely from server system 202 and may be non-centralized. Server system 202 could be any type of computing device configured to perform the steps described herein. System 200 includes at least one point-of-sale device 212 in communication with server system 202. Additionally, performance determination computing device 210 is in communication with server system 202. In some implementations, performance determination computing device 210 is incorporated into or integrated within server system 202.

As discussed below, payment processing system 200 processes payments from transactions between cardholders and merchants. In processing such payments, server system 202 accesses and populates card transaction data ("transaction data"), stored in database 208. The transaction data includes, for example, merchant identifiers, merchant locations, transaction amounts, product identifiers (e.g., stock keeping units (SKUs)), and transaction dates. One or more of the transactions may be initiated at point-of-sale device 212. Accordingly, based on the transaction data, database 208 is populated with identifications of merchants, the location of each merchant, and the prices charged by each merchant for at least one product. Performance determination computing device 210 accesses such data and determines a financial performance of each merchant 124. More specifically, performance determination computing device 210 determines at least four factors, including a cash flow or average cash flow, a standard deviation in the cash flow, a growth rate (i.e., increase or decrease in cash flow over time), and an average revenue per unit sold ("average ticket size") for each merchant 124, based on the stored transaction data.

Performance determination computing device 210 then ranks the merchants 124 in accordance with one or more of the four factors. Performance determination computing device 210 then provides financial performance data for one or more merchants by transmitting an indication of their ranking relative to other merchants, rather than revealing underlying dollar amounts. In some implementations, performance determination computing device 210 withholds names of the merchants. For example, in some implementations, performance determination computing device 210 transmits a description or category of goods and/or services sold by one or more merchants, rather than transmitting names of the one or more merchants.

Figure 3:
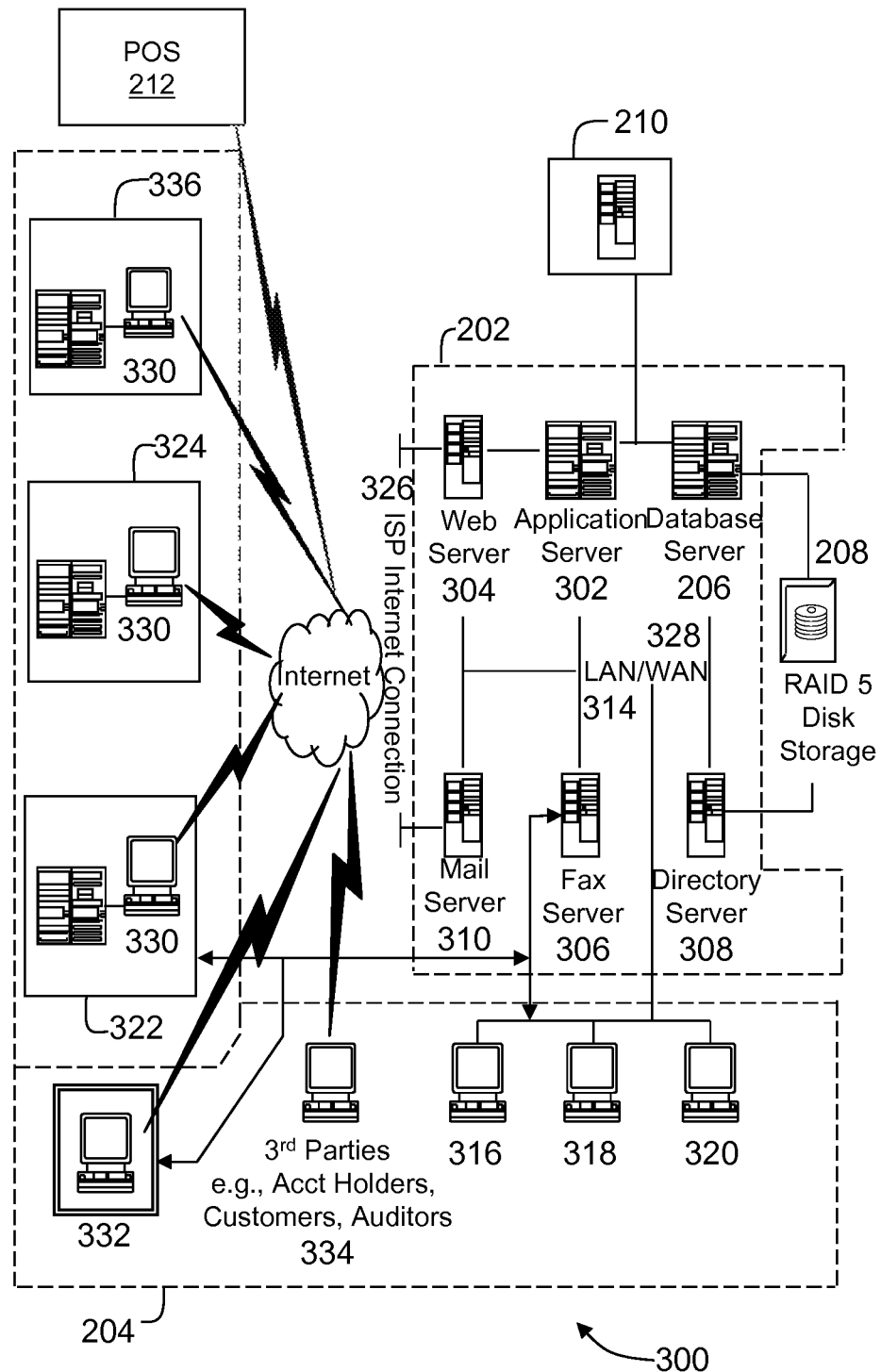

FIG. 3 is an expanded block diagram of an example embodiment of a server architecture of payment processing system 200 in accordance with one embodiment of the present disclosure. Payment processing system 200 includes server system 202, client systems 204, performance determination computing device 210, and point-of-sale device 212. Server system 202 includes database server 206, an application server 302, a web server 304, a fax server 306, a directory server 308, and a mail server 310. Database 208 (e.g., a disk storage unit), is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including acquirers 322 and issuers 324, and to third parties, e.g., auditors, 334 using an Internet connection 326. Server system 202 is also communicatively coupled with at least one merchant 336. Server system 202 is also communicatively coupled to at least one point-of-sale device 212 and to performance determination computing device 210. In some embodiments, performance determination computing device 210 is integrated within server system 202. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems, including a client system 332, using a telephone link. Fax server 306 is configured to communicate with other client systems 316, 318, and 320 as well.

Figure 4:
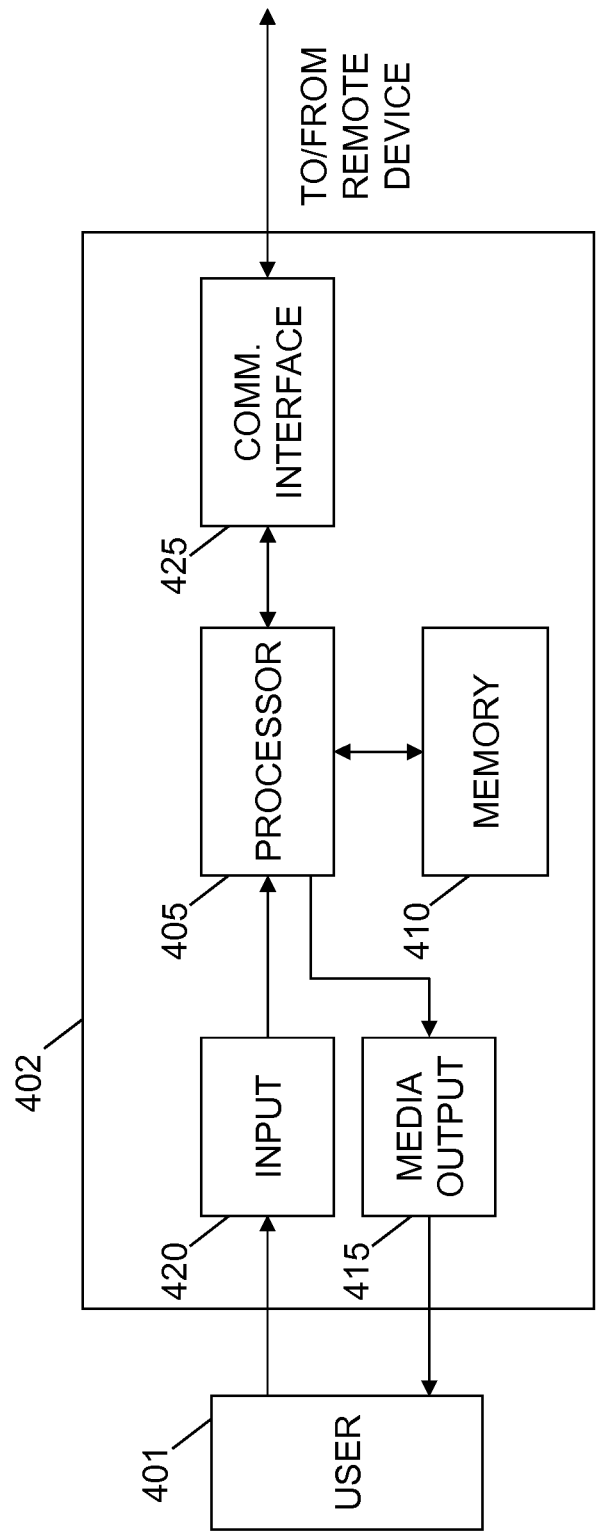

FIG. 4 illustrates an example configuration of a cardholder computing device 402 operated by a cardholder 401. Cardholder computing device 402 may include, but is not limited to, client systems ("client computing devices") 204, 316, 318, and 320, workstation 330, and manager workstation 332 (shown in FIG. 3). The configuration of cardholder computing device 402 is also representative of point-of-sale device 212.

Cardholder computing device 402 includes one or more processors 405 for executing instructions. In some embodiments, executable instructions are stored in a memory area 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

Cardholder computing device 402 also includes at least one media output component 415 for presenting information to cardholder 401. Media output component 415 is any component capable of conveying information to cardholder 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from cardholder 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to cardholder 401 via media output component 415 and, optionally, receiving and processing input from input device 420. A user interface may include, among other possibilities, a web browser and client application. Web browsers enable cardholders, such as cardholder 401, to display and interact with media and other information typically embedded on a web page or a website from server system 202 or a web server associated with a merchant. A client application allows cardholder 401 to interact with a server application from server system 202 or a web server associated with a merchant.

Figure 5:
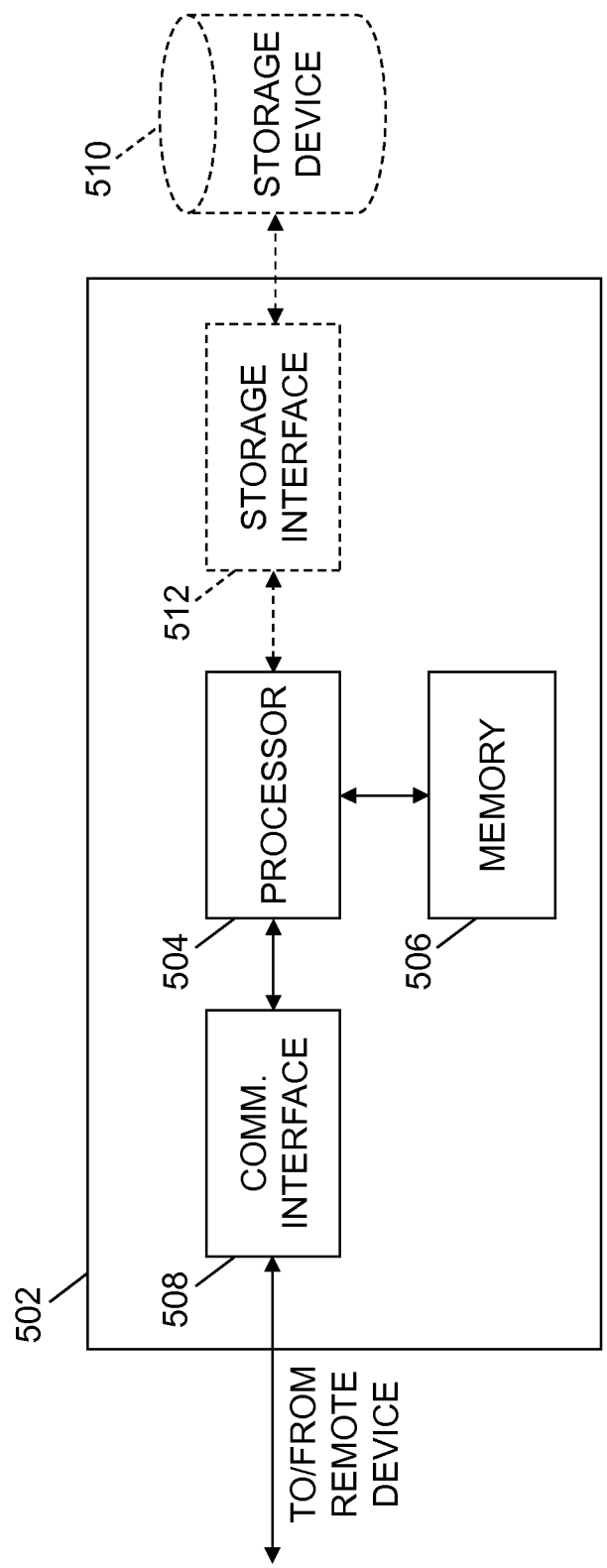

FIG. 5 illustrates an example configuration of a server computing device 502 such as server system 202 (shown in FIGS. 2 and 3). Server computing device 502 may include, but is not limited to, database server 206, application server 302, web server 304, fax server 306, directory server 308, and mail server 310. Server computing device 502 is also representative of performance determination computing device 210.

Server computing device 502 includes one or more processors 504 for executing instructions. Instructions may be stored in one or more memory devices 506, for example. One or more processors 504 may include one or more processing units (e.g., in a multi-core configuration).

One or more processors 504 are operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

One or more processors 504 may also be operatively coupled to one or more storage devices 510. One or more storage devices 510 are any computer-operated hardware suitable for storing and/or retrieving data. In some embodiments, one or more storage devices 510 are integrated in server computing device 502. For example, server computing device 502 may include one or more hard disk drives as one or more storage devices 510. In other embodiments, one or more storage devices 510 are external to server computing device 502 and may be accessed by a plurality of server computing devices 502. For example, one or more storage devices 510 may include multiple storage units such as hard disks or solid state disks in a redundant array of inexpensive disks (RAID) configuration. One or more storage devices 510 may include a storage area network (SAN) and/or a network attached storage (NAS) system. In some embodiments, one or more storage devices 510 may include database 208.

In some embodiments, one or more processors 504 are operatively coupled to one or more storage devices 510 via a storage interface 512. Storage interface 512 is any component capable of providing one or more processors 504 with access to one or more storage devices 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing one or more processors 504 with access to one or more storage devices 510.

One or more memory devices 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
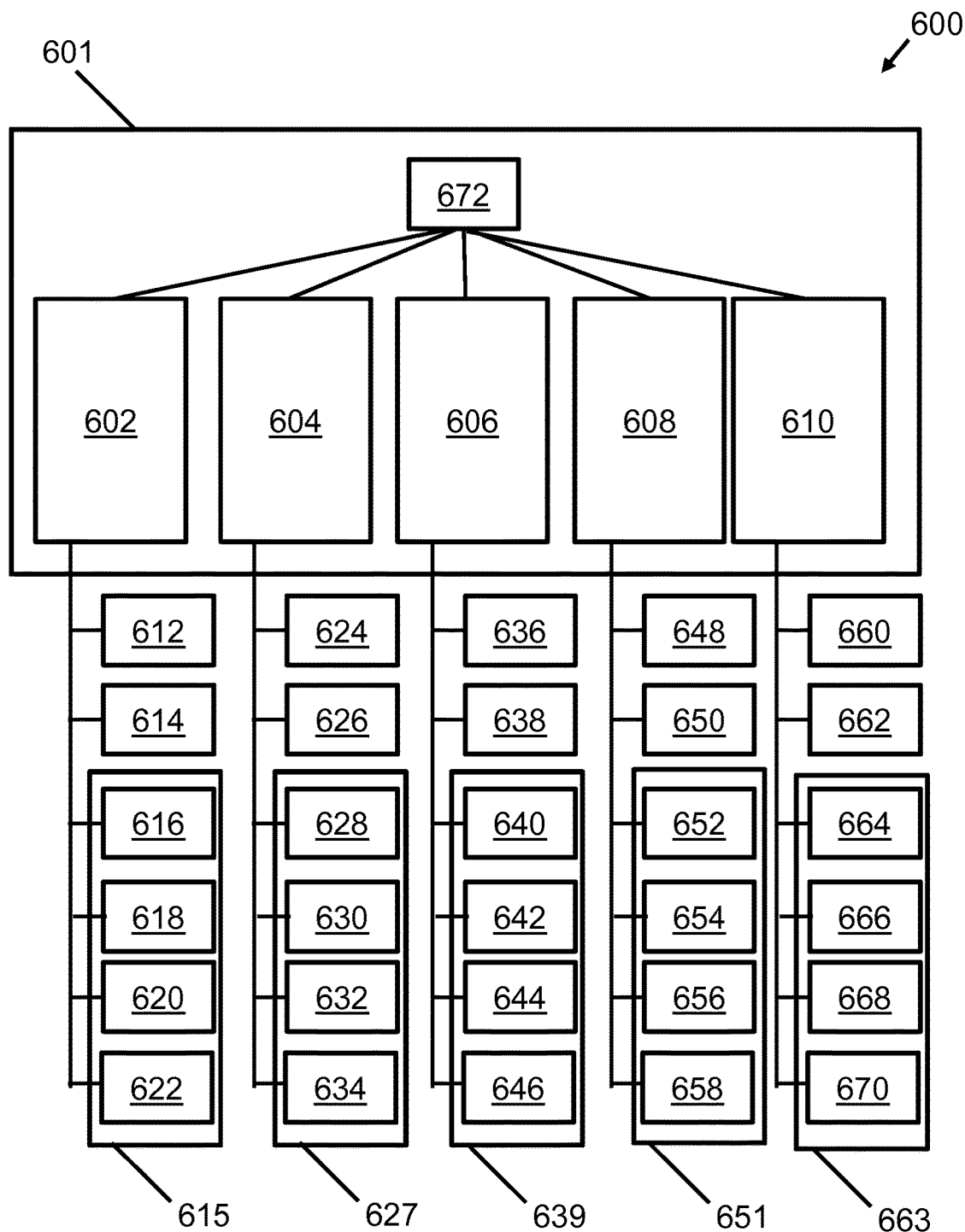

FIG. 6 is a block diagram of an example environment 600 in which a commercial property location 601 includes a plurality of merchants, including a first merchant 602, a second merchant 604, a third merchant 606, a fourth merchant 608, and a fifth merchant 610. Commercial property location 601 is, for example, a strip mall, or other location in which one or more merchants conduct business. First merchant 602 is associated with an identifier 612, for example a name. First merchant 602 is also associated with a category 614 of goods and/or services (referred to herein as "units") sold by first merchant 602. In some implementations, performance determination computing device 210 determines category 614 based on product identifiers included in the transaction data stored in database 208, in association with first merchant 602. For example, performance determination computing device 210 may analyze such product identifiers to determine whether such product identifiers are associated with a particular category 614. Performance determination computing device 210 may be assisted in such analysis by creating, storing, updating, and using entries in database 208 that correlate product identifiers to categories for merchants. Such entries may be referred to as "product-category correlation data." In one example, first merchant 602 is determined to have a plurality of sales of tires, fuel gauges, and head lamps. Performance determination computing device 210 may aggregate such entries of transaction data and compare them to such product-category correlation data in database 208 and determine that first merchant 602 is associated with an automotive category 614. In other examples, performance determination computing device 210 may use language processing methods on transaction data stored in database 208 to identify repeated terms or phrases in order to make such categorizations. In additional examples, performance determination computing device 210 may perform frequency analysis on transaction data stored in database 208 to identify which product data comprises the majority of transaction data. In further examples, performance determination computing device 210 may use external systems (not shown) to assist in correlating product information to categories. Alternately, any other suitable method of identifying categories may be used.

In at least some examples, category 614 may be selected from a predefined list of category labels or category codes. Restricting category 614 to a predefined list may assist in performing rankings as described herein so that merchants 602 that are of similar types may be compared despite not being of precisely the same type. For example, although first merchant 602 may be determined to be a "tennis equipment store" and second merchant 604 may be determined to be a "skiing equipment store", both first merchant 602 and 604 may both be associated with the category 614 of "sporting equipment store" and may be ranked accordingly. Further, in additional examples, a particular merchant 602 may be associated with a plurality of categories 614 that may be of varying levels of scope. For example, a "skiing equipment store" may also be more generally described as a "sporting equipment store" and more generally described as a "retail store." Performance determination computing device 210 may include numerous category labels or category codes into category 614 to facilitate varying scopes of rankings and comparisons.

In other implementations, category 614 is explicitly defined for each merchant 602, and may be determined from identifiers 612. For example, identifier 612 may explicitly state, "XYZ Hardware Store," and allow performance determination computing device 210 to determine that category 614 may be, "hardware store." Additionally, first merchant 602 is associated with a financial performance 615. Performance determination computing device 210 determines financial performance 615 of first merchant 602 by calculating an average cash flow 616 (i.e., average revenue), a standard deviation 618 in the cash flow (i.e., revenue), a growth rate 620 (i.e., increase or decrease in revenue over time), and a revenue per unit sold 622 (also referred to herein as "average ticket size") based on the transaction data stored in database 208 in association with first merchant 602. In some implementations, performance determination computing device 210 may apply a predefined scaling factor to average cash flow 616, standard deviation 618, and growth rate 620 to account for financial transactions that are not processed through payment card system payment network 128, for example payments made with checks.

Similarly second merchant 604 is associated with an identifier 624, a category 626 of goods and/or services, and a financial performance 627. Performance determination computing device 210 determines financial performance 627 by calculating an average cash flow 628, a standard deviation 630 in the cash flow, a growth rate 632, and a revenue per unit sold 634, based on the transaction data stored in database 208 in association with second merchant 604. Likewise, third merchant 606 is associated with an identifier 636, a category 638 of goods and/or services, and a financial performance 639. Performance determination computing device 210 determines financial performance 639 by calculating an average cash flow 640, a standard deviation 642 in cash flow, a growth rate 644, and a revenue per unit sold 646, based on transaction data stored in database 208 in association with third merchant 606.

Additionally, fourth merchant 608 is associated with an identifier 648, a category 650 of goods and/or services, and a financial performance 651. Performance determination computing device 210 determines financial performance 651 by calculating an average cash flow 652, a standard deviation 654 in cash flow, a growth rate 656, and a revenue per unit sold 658, based on transaction data stored in database 208 in association with fourth merchant 608. In addition, fifth merchant 610 is associated with an identifier 660, a category 662 of goods and/or services, and a financial performance 663. Performance determination computing device 210 determines financial performance 663 by calculating an average cash flow 664, a standard deviation 666, a growth rate 668, and a revenue per unit sold 670, based on transaction data stored in database 208 in association with fifth merchant 610. In some implementations, performance determination computing device 210 determines an overall financial performance 672 of commercial property location 601 based on one or more of financial performances 615, 627, 639, 651, and 663.

Figure 7:
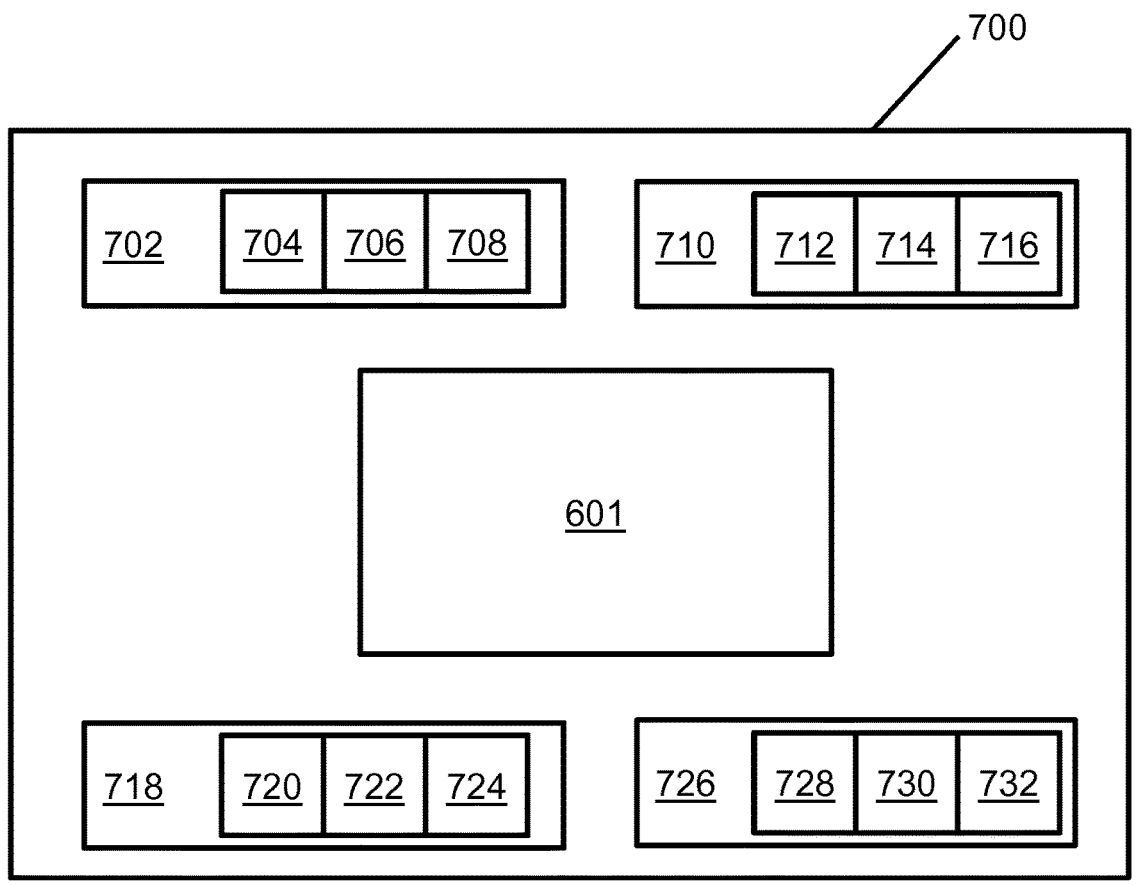

FIG. 7 is a block diagram of a geographic area 700 that includes commercial property location 601, a sixth merchant 702, a seventh merchant 710, an eighth merchant 718, and a ninth merchant 726. More specifically, in the example embodiment, merchants 702, 710, 718, and 726 are not included within commercial property location 601.

Sixth merchant 702 is associated with an identifier 704, a category 706 of goods and/or services, and a financial performance 708 determined by performance determination computing device 210. Seventh merchant 710 is associated with an identifier 712, a category 714 of goods and/or services, and a financial performance 716 determined by performance determination computing device 210. Eighth merchant 718 is associated with an identifier 720, a category 722 of goods and/or services, and a financial performance 724 determined by performance determination computing device 210. Further, ninth merchant 726 is associated with an identifier 728, a category 730 of goods and/or services, and a financial performance 732 determined by performance determination computing device 210. Performance determination computing device 210 accordingly determines financial performances 708, 716, 724, and 732 based on transaction data stored in database 208 in association with sixth merchant 702, seventh merchant 710, eighth merchant 718, and ninth merchant 726 respectively. Further, performance determination computing device 210 is similarly configured to determine categories 706, 714, 722, and 730 based upon product identifiers 704, 712, 720, and 728, respectively.

Figure 8:
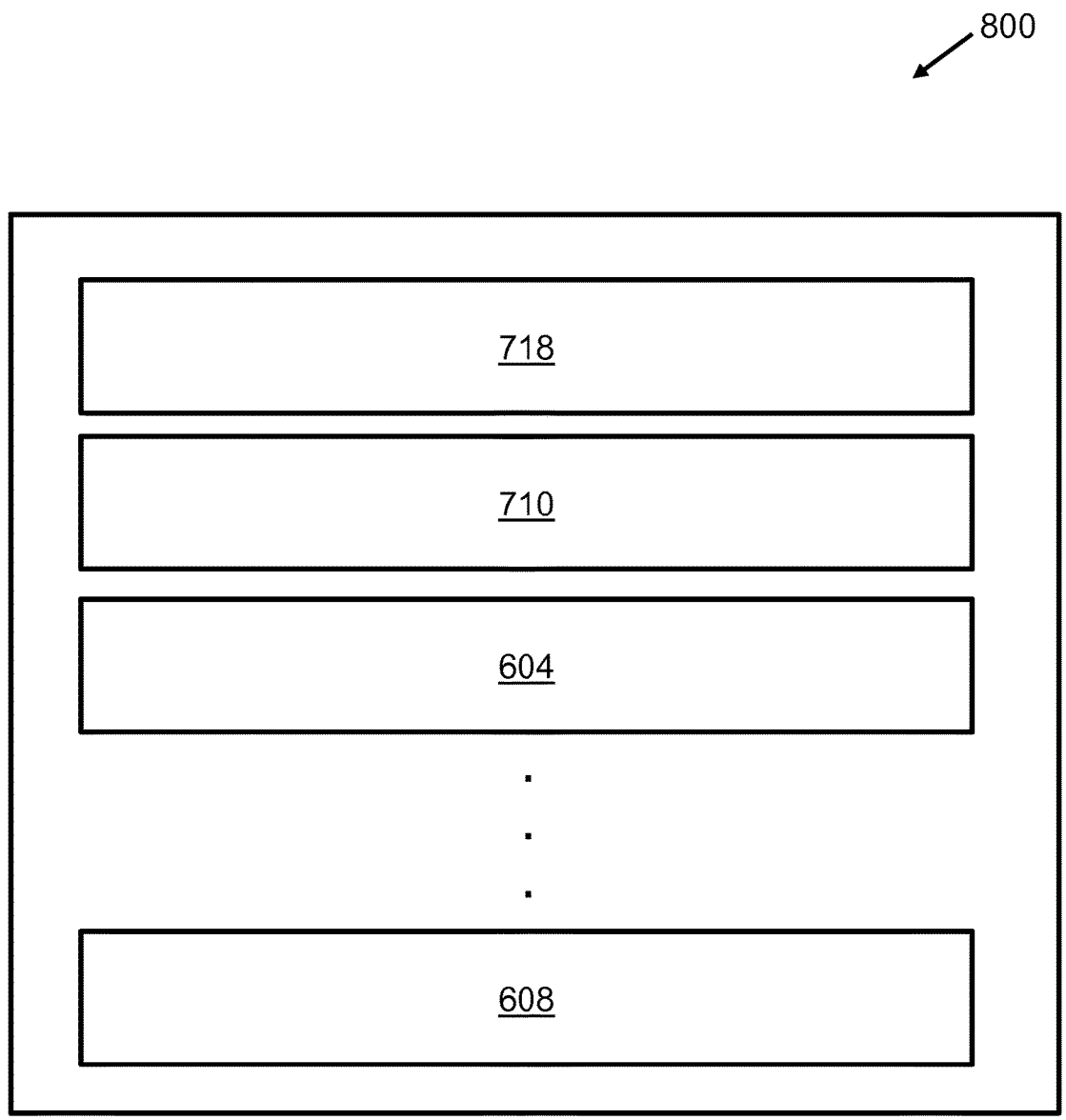

FIG. 8 is a diagram of an example ranked list 800 of merchants based on financial performance. More specifically, performance determination computing device 210 ranks merchants (e.g., merchants 602, 604, 606, 608, 610, 702, 710, 718, and 726) in ascending or descending order based on financial performances (e.g., financial performances 615, 627, 639, 651, 663, 708, 716, 724, 732) of the merchants. More specifically, ranked list 800 is based on average cash flow (e.g., average cash flow 616). In some implementations, performance determination computing device 210 ranks a set of merchants by constraining the set of merchants on one or more parameters, such as an identification of a geographic area (e.g., geographic area 700), for example a zip code or distance from a particular location (e.g., a distance from commercial property location 601). In other implementations, performance determination computer device 210 ranks a set of merchants by constraining the set of merchants by categories of goods and services 706, 714, 722, and 730. In ranked list 800, eighth merchant 718 is ranked higher than seventh merchant 710, and seventh merchant 710 is ranked higher than second merchant 604. Fourth merchant 608 is ranked last, meaning that fourth merchant 608 has the smallest average cash flow of the ranked merchants (e.g., merchants 602, 604, 606, 608, 610, 702, 710, 718, and 726).

In other implementations, performance determination computing device 210 generates a ranking based on one or more other factors of financial performance, for example, a standard deviation (e.g., standard deviation 618) in the cash flow, a growth rate (e.g., growth rate 620) and an average revenue per unit sold (e.g., average revenue per unit sold 622) for each merchant in ranked list 800. As will be appreciated by those skilled in the art, a relatively high standard deviation in cash flow is an indication of lesser financial performance compared to a relatively low standard deviation in cash flow. For the other financial performance factors (e.g., average cash flow, growth rate, and average revenue per unit sold), a relatively high value is an indicator of greater financial performance than a relatively low value.

In some implementations, performance determination computing device 210 additionally ranks overall financial performance 672 for commercial property location 601 in ranked list 800, thereby enabling performance determination computing device 210 to transmit an indication of whether one or more particular merchants, if included within commercial property location 601, would increase overall financial performance 672 of commercial property location 601, decrease overall financial performance 672 of commercial property location 601, and/or have little or no effect on overall financial performance 672 of commercial property location 601. More specifically, in one such implementation performance determination computing device 210 aggregates overall financial performance 672 for commercial property 601 and uses overall financial performance 672 to create a baseline. Performance determination computing device 210 further assesses the effect of merchants 702, 710, 718, and 726 on commercial property 601 by substituting each merchant 702, 710, 718, and 726 for each of merchants 602, 604, 606, 608, and 610. Accordingly, performance determination computing device 210 creates overall financial performance scenarios (not shown) wherein each merchant 702, 710, 718, and 726 not presently in commercial property 601 is swapped for each merchant 602, 604, 606, 608, and 610 that is presently in commercial property 601. Such overall financial performance scenarios are compared and ranked in the manner described herein. Accordingly, the effect of adding each of merchants 702, 710, 718, and 726 to commercial property 601 may be considered. Further, in at least some examples, multiple merchants 702, 710, 718, and 726 may be considered to be substituted into commercial property 601 and assessed and ranked as described herein. Using these methods, performance determination computing device 210 can accordingly transmit the determined effect of adding a particular merchant or combination of merchants to overall financial performance 672. In a similar manner, performance determination computing device 210 may determine the impact of removing each of merchants 602, 604, 606, 608, and 610 from commercial property 601. In at least some examples, it may be undesirable for a particular commercial property 601 to include multiple merchants 602, 604, 606, 608, and 610 of the same categories 614, 626, 638, 650, and 662. Accordingly, in some examples, performance determination computing device 210 may only consider scenarios where commercial property 601 includes merchants 602, 604, 606, 608, 610, 702, 710, 718, and 726 with limited duplication or no duplication of categories 614, 626, 638, 650, and 662.

Figure 9:
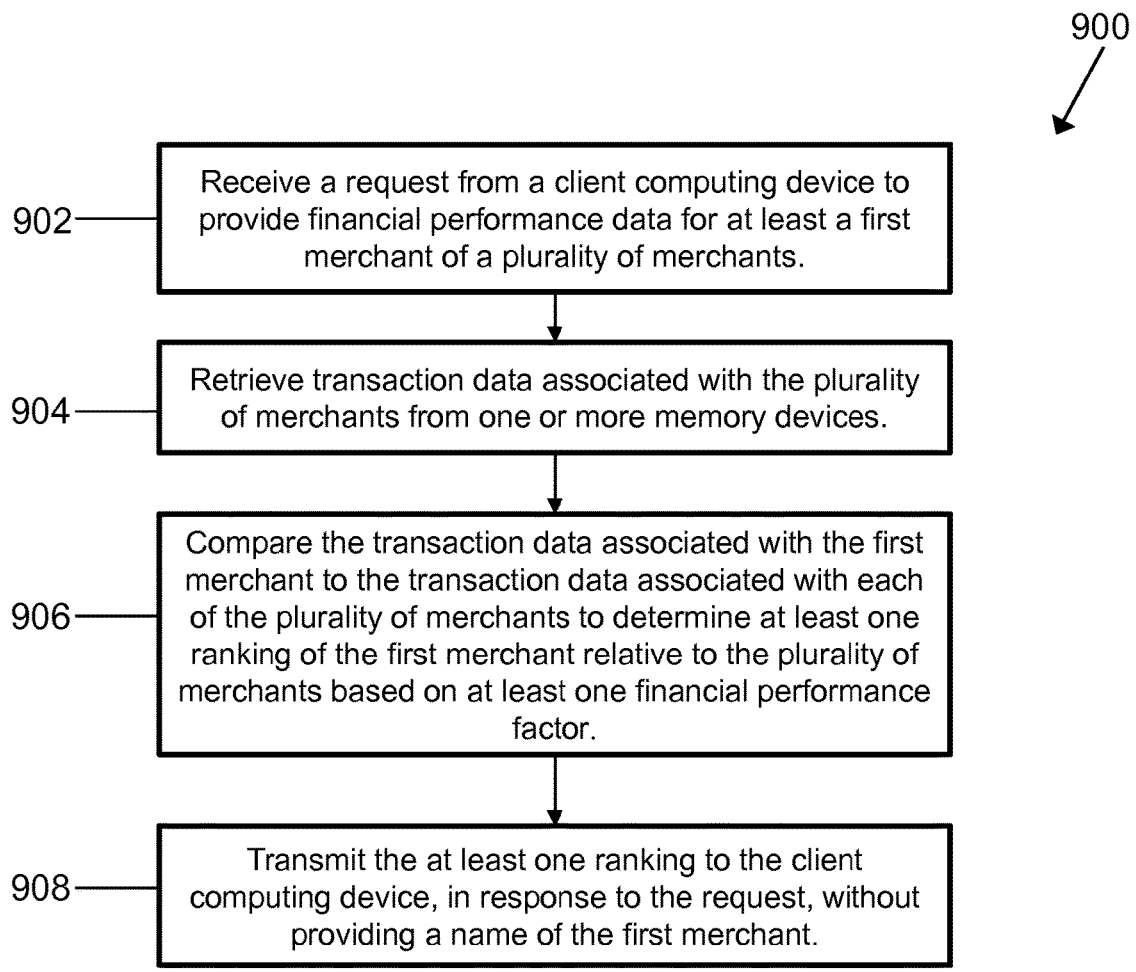

FIG. 9 is a flowchart of an example process 900 that may be performed by payment processing system 200, and more specifically, by performance determination computing device 210, for providing financial performance data associated with a merchant (e.g., merchant 702). Initially, performance determination computing device 210 receives 902 a request from a client computing device (e.g., client computing device 204) to provide financial performance data for at least a first merchant (e.g., merchant 702) of a plurality of merchants (e.g., merchants 602, 604, 606, 608, 610, 702, 710, 718, 726). For example, the request may identify the merchant (e.g., merchant 702) by a merchant identifier (e.g., identifier 704). In other implementations, the request specifies a category of goods and/or services (e.g., category 706) associated with the merchant (e.g., merchant 702). In some implementations, the request may specify a geographic area (e.g., geographic area 700), for example a zip code or distance from a predefined location (e.g., a distance from commercial property location 601), which performance determination computing device 210 uses to select a subset of merchants for comparison and ranking purposes.

Additionally, performance determination computing device 210 retrieves 904 transaction data associated with the plurality of merchants (e.g., merchants 602, 604, 606, 608, 610, 702, 710, 718, 726) from one or more memory devices (e.g., database 208). Additionally, performance determination computing device 210 compares 906 the transaction data associated with the first merchant (e.g., merchant 702) to the transaction data associated with each of the plurality of merchants (e.g., merchants 602, 604, 606, 608, 610, 710, 718, 726) to determine at least one ranking of the first merchant (e.g., merchant 702) relative to the plurality of merchants (e.g., 602, 604, 606, 608, 610, 710, 718, 726) based on at least one financial performance factor (e.g., cash flow or average cash flow, standard deviation in cash flow, growth rate, and/or revenue per unit sold).

Additionally, performance determination computing device 210 transmits 908 the at least one ranking to the client computing device 204, in response to the request, without providing a name of the first merchant (e.g., identifier 704 of merchant 702). For example, in some implementations, performance determination computing device 210 transmits a category (e.g., category 706) of goods and/or services sold by the first merchant (e.g., merchant 702), rather than transmitting the name of the first merchant (e.g., identifier 704 of merchant 702). In some alternative implementations, performance determination computing device 210 transmits identifier 704 in an anonymous manner by using, for example, a scrambled or encoded identifier that does not identify merchant 702 directly. In some implementations, performance determination computing device 210 transmits the ranking as a percentile (e.g., 1% or 99%). In other implementations, performance determination computing device 210 transmits the ranking as a position of the first merchant (e.g., merchant 702) relative to the other merchants (e.g., first out of nine). In some implementations, performance determination computing device 210 transmits an ordered list of the plurality of merchants (e.g., 602, 604, 606, 608, 610, 702, 710, 718, 726), wherein the merchants are identified, for example, by each merchant's respective category of goods and/or services.

In some implementations, process 900 additionally includes storing, in the one or more memory devices (e.g., database 208), the payment card transaction data for payments processed through a payment network (e.g., payment card system payment network 128). In some implementations, performance determination computing device 210 additionally determines a cash flow or average cash flow for each of the plurality of merchants, based at least in part on the transaction data. In some implementations, performance determination computing device 210 ranks the plurality of merchants in descending order based on the cash flow of each merchant. In some implementations, performance determination computing device 210 determines a standard deviation in a cash flow for each of the plurality of merchants, based at least in part on the stored transaction data.

In some implementations, performance determination computing device 210 ranks the plurality of merchants in ascending order based on the standard deviation in the cash flow of each merchant. In some implementations, performance determination computing device 210 determines a growth rate for each of the plurality of merchants, based at least in part on the transaction data. In some implementations, performance determination computing device 210 ranks the plurality of merchants in descending order based on the growth rate of each merchant. In some implementations, performance determination computing device 210 determines a revenue per unit sold for each of the plurality of merchants, based at least in part on the transaction data. In some implementations, performance determination computing device 210 restricts the plurality of merchants to a subset of the plurality of merchants located within a predetermined geographic area (e.g., geographic area 700). In some implementations, performance determination computing device 210 transmits to the client computing device 204 an indication of an effect (i.e., an increase, a decrease, or no effect) on an overall financial performance of a commercial property location (e.g., commercial property location 601) from adding the first merchant to the commercial property location. In some implementations, performance determination computing device 210 weights the at least one ranking of the first merchant based on a size (e.g., revenue) of the first merchant.

Figure 10:
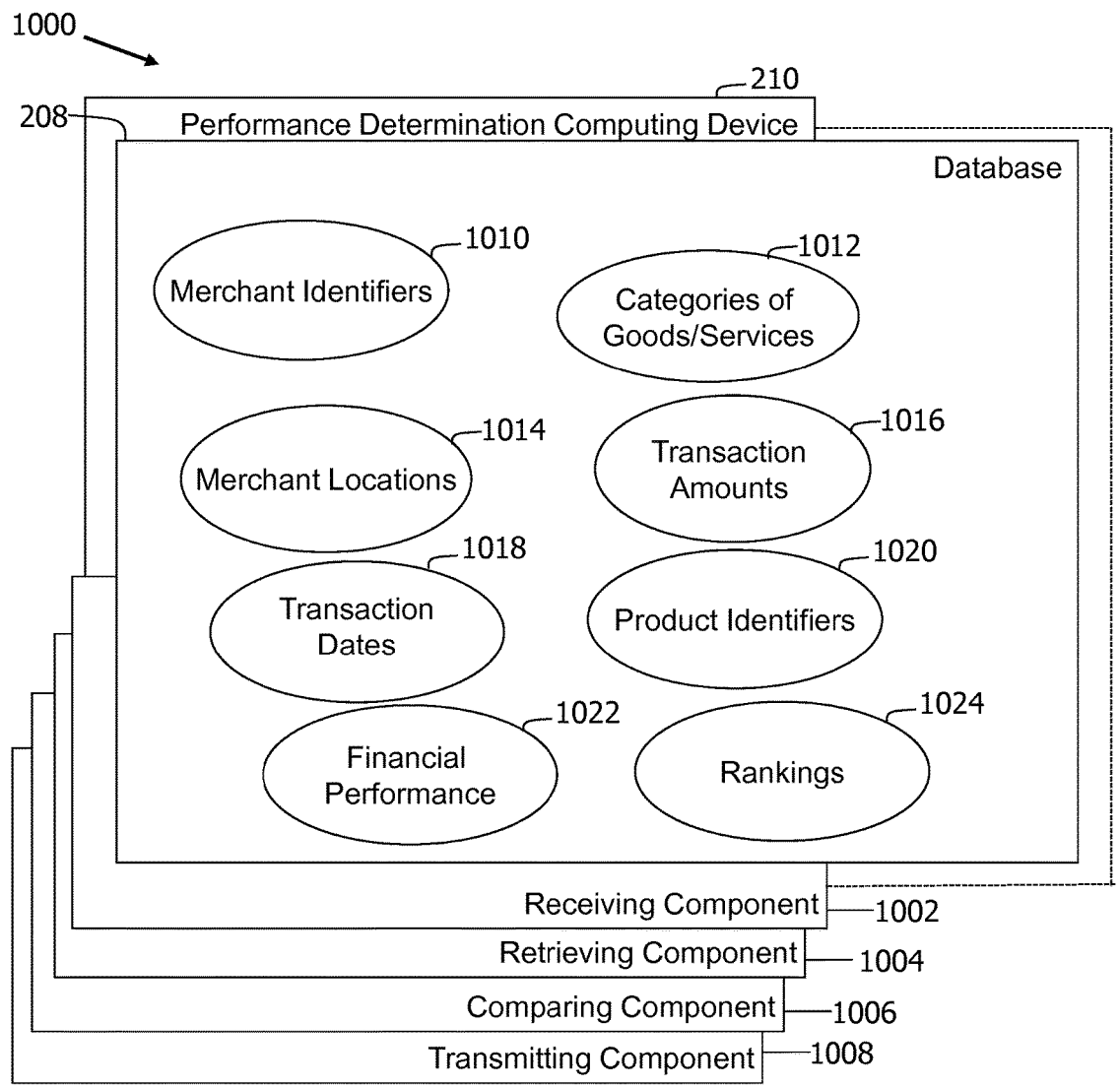

FIG. 10 is a diagram 1000 of components of one or more example computing devices, for example, performance determination computing device 210, that may be used in embodiments of the described systems and methods. FIG. 10 further shows a configuration of database 208 (FIG. 2). Database 208 is communicatively coupled to performance determination computing device 210.

Performance determination computing device 210 includes a receiving component 1002 for receiving a request from a client computing device 204 to provide financial performance data for at least a first merchant of a plurality of merchants. Performance determination computing device 210 additionally includes a retrieving component 1004 for retrieving transaction data associated with the plurality of merchants from one or more memory devices (e.g., database 208). Performance determination computing device 210 additionally includes a comparing component 1006 for comparing the transaction data associated with the first merchant to the transaction data associated with each of the plurality of merchants to determine at least one ranking of the first merchant relative to the plurality of merchants based on at least one financial performance factor. Additionally, performance determination computing device 210 includes a transmitting component 1008 for transmitting the at least one ranking to client computing device 204, in response to the request, without providing a name of the first merchant.

In an example embodiment, database 208 is divided into a plurality of sections, including but not limited to, a merchant identifiers component 1010, a categories of goods and/or services component 1012, a merchant locations section 1014, a transaction amounts section 1016, a transaction dates section 1018, a product identifiers section 1020, a financial performance section 1022, and a rankings section 1024. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for providing financial performance data pertaining to one or more merchants provide the financial performance data in terms of a ranking of the one or more merchants relative to other merchants. Accordingly, embodiments of the systems and methods described herein obfuscate the underlying monetary amounts involved in the financial performance while providing information that may be useful in making business decisions regarding the one or more merchants.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for predicting a financial performance of a commercial property location using financial performance data associated with a merchant, said method implemented using a performance determination computing device in networked communication with a payment network computing device associated with a payment network, said method comprising:
    receiving a request from a client computing device to provide financial performance data for at least a first merchant having a location different than the commercial property location, and for a plurality of second merchants each located at the commercial property location;
    retrieving, by the performance determination computing device from the payment network computing device, transaction data associated with the first merchant and plurality of second merchants, wherein the retrieved transaction data is associated with payments processed through the payment network;
    determining first values for a plurality of financial performance factors for the first merchant, based on the retrieved transaction data, the plurality of financial performance factors including at least one of a cash flow, a standard deviation for the cash flow, a revenue per unit sold, and a growth rate for each of the plurality of merchants;
    determining second values for at least one second merchant of the plurality of second merchants for the plurality of financial performance factors, based on the retrieved transaction data;
    comparing the first values to the second values to determine at least one ranking of the first merchant relative to the at least one second merchant;
    determining, by the performance determination computing device, based on the at least one ranking, an impact of adding the first merchant to the commercial property location;
    generating, by the performance determination computing device, based on the determined impact, a financial prediction for the commercial property location, representing a financial performance of the commercial property location when the first merchant is included within the commercial property location; and
    transmitting the at least one ranking and the financial prediction to the client computing device, in response to the request, without providing the first value or the retrieved transaction data.

2. The method of claim 1, further comprising determining a cash flow for the first merchant and each of the plurality of second merchants, based at least in part on the retrieved transaction data.

3. The method of claim 1, further comprising determining a standard deviation in a cash flow for the first merchant and each of the plurality of second merchants, based at least in part on the retrieved transaction data.

4. The method of claim 1, further comprising determining a growth rate for the first merchant and each of the plurality of second merchants, based at least in part on the retrieved transaction data.

5. The method of claim 1, further comprising determining a revenue per unit sold for each of the first merchant and the plurality of second merchants, based at least in part on the retrieved transaction data.

6. The method of claim 1, further comprising ranking the first merchant and the plurality of second merchants based on at least one of:
    a cash flow of each merchant of the first merchant and the plurality of second merchants;
    a standard deviation in the cash flow of each merchant of the first merchant and the plurality of second merchants;
    a growth rate of each merchant of the first merchant and the plurality of second merchants; and
    a revenue-per-unit sold for each merchant of the first chan and the plurality of second merchants.

7. The method of claim 1, further comprising:
    restricting the plurality of second merchants to a first restricted subset of the plurality of second merchants located within a predetermined geographic area, Wherein the determined impact is calculated assuming that the first merchant is included in the first restricted subset of the plurality of merchants; and
comparing the retrieved transaction data associated with the first merchant to the transaction data associated with each of the first restricted subset of the plurality of second merchants to determine at least one ranking of the first merchant relative to the first restricted subset of the plurality of second merchants based on the at least one financial performance factor.

8. The method of claim 1, further comprising:
determining at least one merchant category for each of the first merchant and the plurality of second merchants based, at least in part, on the retrieved transaction data.

9. The method of claim 8, further comprising:
restricting the plurality of second merchants to a second restricted subset of the plurality of second merchants based on a predetermined merchant category, wherein the determined impact is calculated assuming that the first merchant is included in the second restricted subset of the plurality of merchants, and wherein the predetermined merchant category is different from the at least one merchant category; and
comparing the retrieved transaction data associated with the first merchant to the retrieved transaction data associated with each of the second restricted subset of the plurality of second merchants to determine at least one ranking of the first merchant relative to the second restricted subset of the plurality of second merchants based on the at least one financial performance factor.

10. The method of claim 1, further comprising transmitting to the client computing device an indication of the impact of adding the first merchant to the commercial property location.

11. The method of claim 1, further comprising weighting the at least one ranking of the first merchant based on a size of the first merchant.

12. A computing device for predicting a financial performance of a commercial property location using financial performance data associated with a merchant, said computing device comprising one or more processors in communication with one or more memory devices, said computing device being in networked communication with a payment network computing device associated with a payment network and configured to:
receive a request from a client computing device to provide financial performance data for at least a first merchant having a location different than the commercial property location, and for a plurality of second merchants each located at the commercial property location;
retrieve, from the payment network computing device, transaction data associated with the first merchant and plurality of second, wherein the retrieved transaction data is associated with payments processed through the payment network;
determine first values for a plurality of financial performance factors for the first merchant, based on the retrieved transaction data, the plurality of financial performance factors including at least one of a cash flow, a standard deviation for the cash flow, a revenue per unit sold, and a growth rate for each of the plurality of merchants;
determine second values for at least one second merchant of the plurality of second merchants for the plurality of financial performance factors, based on the retrieved transaction data;
compare the first values to the second values to determine at least one ranking of the first merchant relative to the at least one second merchant;
determine, based on the at least one ranking, an impact of adding the first merchant to the commercial property location;
generate, based on the determined impact, a financial prediction for the commercial property location, representing a financial performance of the commercial property location when the first merchant is included within the commercial property location; and
transmit the at least one ranking to the client computing device, in response to the request, without providing the first value or the retrieved transaction data.

13. The computing device of claim 12, further configured to determine a cash flow for the first merchant and each of the plurality of second merchants, based at least in part on the retrieved transaction data.

14. The computing device of claim 12, further configured to determine a standard deviation in a cash flow for the first merchant and each of the plurality of second merchants, based at least in part on the retrieved transaction data.

15. The computing device of claim 12, further configured to determine a growth rate for the first merchant and each of the plurality of second merchants, based at least in part on the retrieved transaction data.

16. The computing device of claim 12, further configured to determine a revenue per unit sold for the first merchant and each of the plurality of second merchants, based at least in part on the retrieved transaction data.

17. The computing device of claim 12, further configured to rank the first merchant and the plurality of second merchants based on at least one of:
a cash flow of each merchant of the first merchant and the plurality of second merchants;
a standard deviation in the cash flow of each merchant of the first merchant and the plurality of second merchants;
a growth rate of each merchant of the first merchant and the plurality of second merchants; and
a revenue-per-unit sold for each merchant of the first merchant and the plurality of second merchants.

18. The computing device of claim 12, further configured to:
restrict the plurality of second merchants to a first restricted subset of the plurality of second merchants located within a predetermined geographic area, wherein the determined impact is calculated assuming that the first merchant is included in the first restricted subset of the plurality of merchants; and
compare the retrieved transaction data associated with the first merchant to the transaction data associated with each of the first restricted subset of the plurality of second merchants to determine at least one ranking of the first merchant relative to the first restricted subset of the plurality of second merchants based on the at least one financial performance factor.

19. A non-transitory computer-readable storage medium having computer-executable instructions embodied thereon for predicting a financial performance of a commercial property location using financial performance data associated with a merchant, wherein when executed by a computing device in networked communication with a payment network computing device, and having one or more processors in communication with one or more memory devices, the computer-executable instructions cause the computing device to:

receive a request from a client computing device to provide financial performance data for at least a first merchant having a location different than the commercial property location, and for a plurality of second merchants each located at the commercial property location;

retrieve, from the payment network computing device transaction data associated with the first merchant and plurality of second merchants, wherein the retrieved transaction data is associated with payments processed through the payment network;

determine first values for a plurality of financial performance factors for the first merchant, based on the retrieved transaction data, the plurality of financial performance factors including at least one of a cash flow, a standard deviation for the cash flow, a revenue per unit sold, and a growth rate for each of the plurality of merchants;

determine second values for at least one second merchant of the plurality of second merchants for the plurality of financial performance factors, based on the retrieved transaction data;

compare the first values to the second values to determine at least one ranking of the first merchant relative to the at least one second merchant;

determine, based on the at least one ranking, an impact of adding the first merchant to the commercial property location;

generate, based on the determine impact, a financial prediction for the commercial property location, representing a financial performance of the commercial property location when the first merchant is included within the commercial property location; and transmit the at least one ranking to the client computing device, in response to the request, without providing the first value or the retrieved transaction data.

* * * * *